United States Patent [19]

Horian et al.

[11] 4,086,644
[45] Apr. 25, 1978

[54] MAGNETIC TAPE SENSING HEAD DEMAGNETIZER

[76] Inventors: Richard C. Horian, 1740 Strickland Dr., Bloomfield Hills, Mich. 48013; James G. Horian, 7340 Indiana, Dearborn, Mich. 48126

[21] Appl. No.: 806,416

[22] Filed: Jun. 14, 1977

[51] Int. Cl.$^2$ .............................................. H01F 13/00
[52] U.S. Cl. .................................................... 361/149
[58] Field of Search ................ 361/149; 360/128, 137; 335/284

[56] References Cited

U.S. PATENT DOCUMENTS

| | | | |
|---|---|---|---|
| 3,435,300 | 3/1969 | Sato | 361/149 |
| 3,582,217 | 6/1971 | Trist | 360/109 |
| 3,997,919 | 12/1976 | Thompson | 360/128 |
| 4,030,002 | 6/1977 | Alexandrovich et al. | 335/284 |

Primary Examiner—Robert S. Tupper
Attorney, Agent, or Firm—Reising, Ethington, Barnard, Perry & Brooks

[57] ABSTRACT

A magnetic tape sensing head demagnetizer disclosed has a housing with a hollow handle portion and a clear plastic probe portion projecting outwardly from the handle portion. A coil within the handle portion receives the inner end of a core which has an outer probe end that is received by the probe portion to protect it during demagnetizing of a tape sensing head as an AC voltage provides a pulsating flux to the core. A bulb received within the handle portion of the housing shines light through the probe portion thereof to provide illumination during the demagnetizing. Closing of a normally open switch energizes the coil with the AC voltage and concomitantly applies a portion of the voltage across the coil to the bulb to provide the illumination. An inner end of the probe portion is mounted by the handle portion with the probe end of the core located adjacent one lateral side edge of the probe portion and the bulb located adjacent the other side edge in a construction that gives the probe portion good light gathering and transmitting characteristics. Intensification of the transmitted light is achieved by tapering of the probe portion side edges toward each other in a direction toward the distal end of the probe portion. The handle portion of the housing has tapering side walls connected by a flat wall and a curved wall, all of which cooperate to facilitate handling of the demagnetizer and operation of the switch whose actuating button projects outwardly from the flat wall.

6 Claims, 5 Drawing Figures

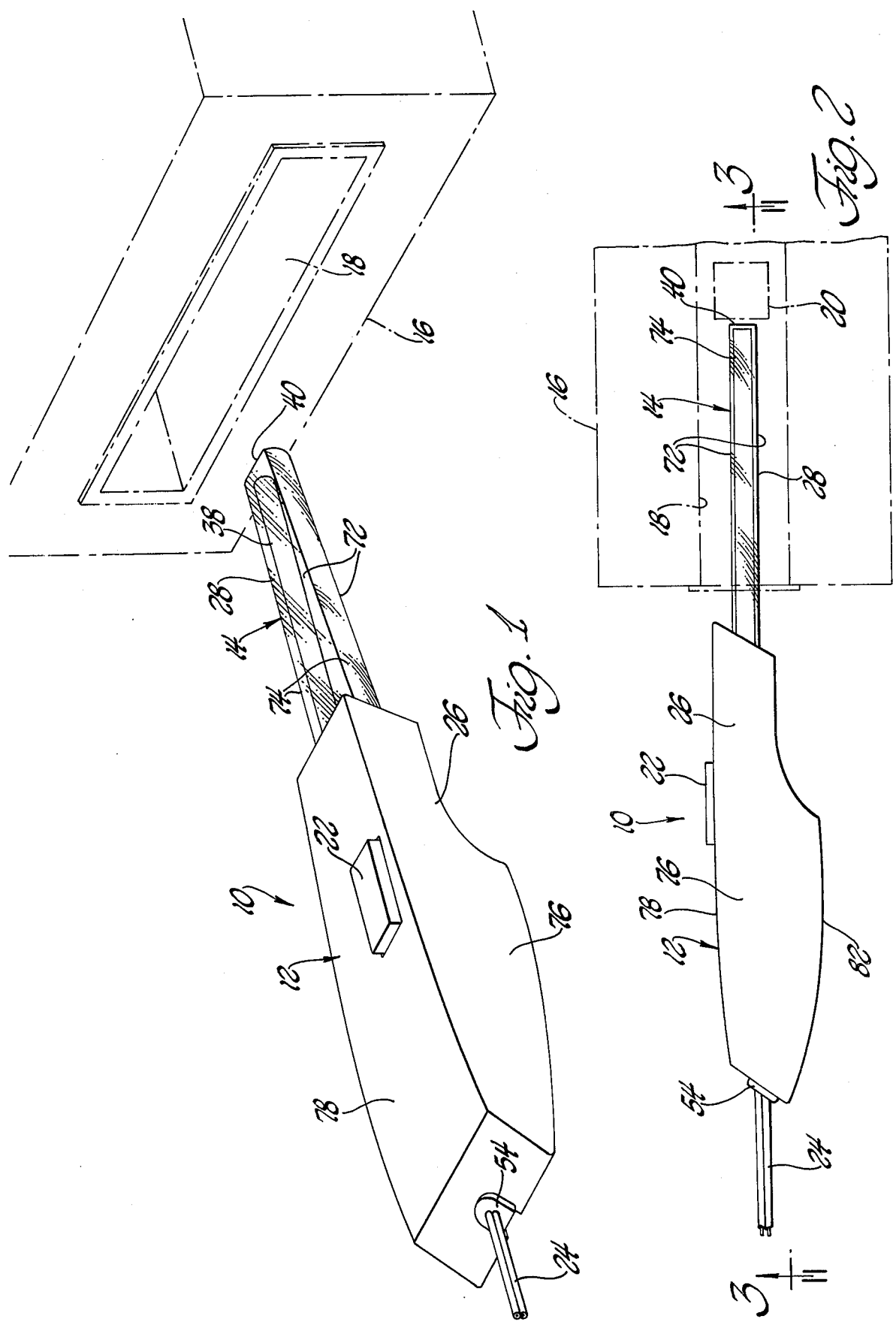

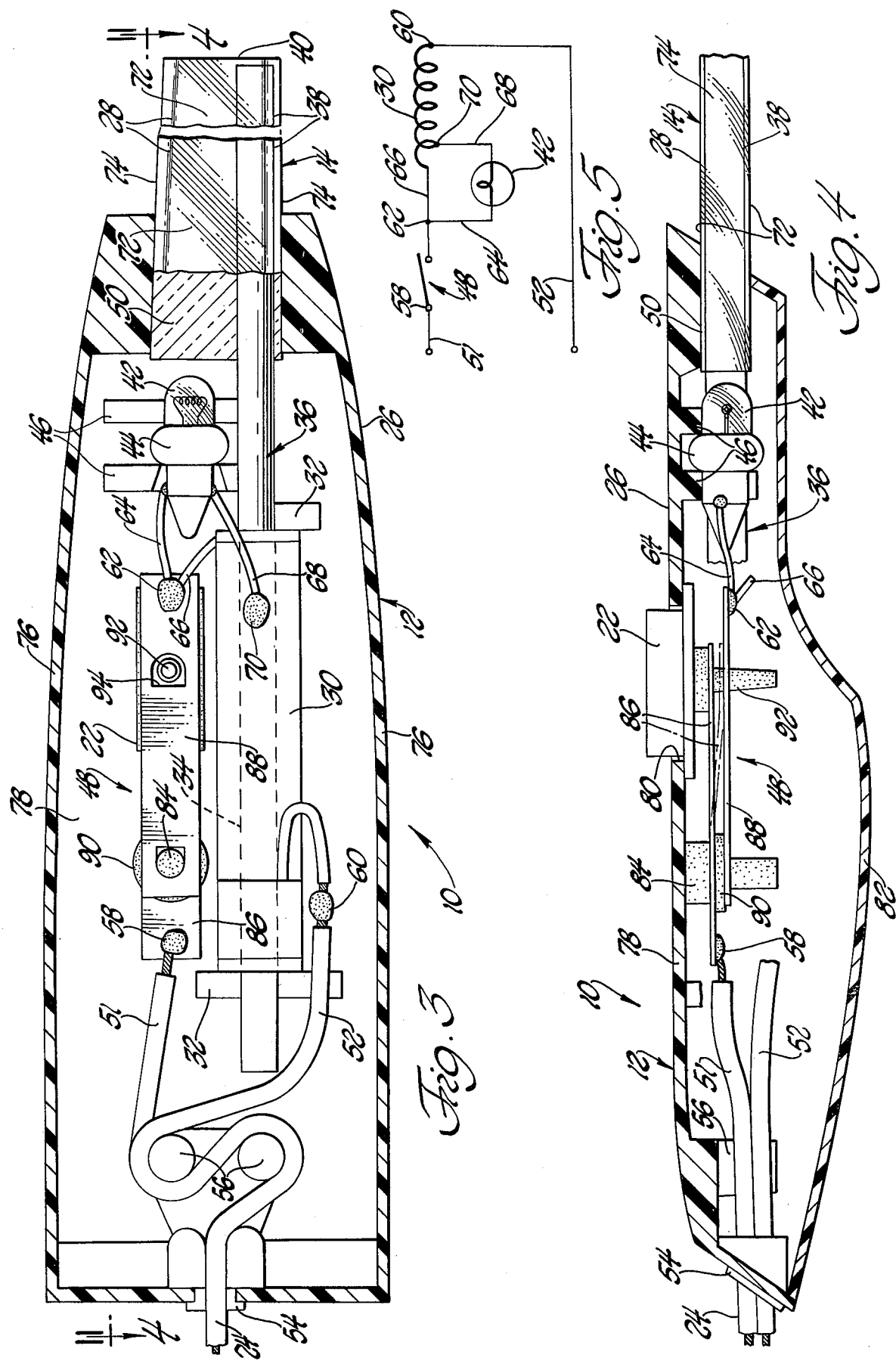

MAGNETIC TAPE SENSING HEAD DEMAGNETIZER

BACKGROUND OF THE INVENTION

1. Field of the Invention

This invention relates to demagnetizers for use in removing permanent magnetism that is imparted to magnetic tape sensing heads of electrical sound systems over a period of use.

2. Description of the Prior Art

Metallic sensing heads of magnetic tape sound systems require periodic demagnetizing of a permanent magnetism that is imparted during use. Conventional demagnetizers include a handle and a metallic probe that projects from the handle to transmit a pulsating flux generated by an AC coil. Positioning of the probe adjacent a sensing head removes any permanent magnetism thereof so that the head is ready for another period of use. Sensing heads for playing magnetic tapes of the cartridge type are located within a slot into which the cartridge is inserted for playing. This location of the cartridge sensing heads makes them somewhat difficult to see and causes difficulty in properly positioning the demagnetizer probe as the demagnetizing is being performed. The probes are also uninsulated and can thus transmit an electrical current from the sound equipment. Likewise, metal to metal contact of the probe with the sensing head as well as with other metallic components of the sound equipment can cause scratching or other damage that can lessen the fidelity of the sound produced.

SUMMARY OF THE INVENTION

An object of the present invention is to provide an improved magnetic tape sensing head demagnetizer which provides illumination upon operation of the demagnetizer in order to permit proper positioning as the demagnetizing is being performed. In carrying out this object, the demagnetizer includes a housing having a hollow handle portion and a clear plastic probe portion projecting outwardly from the handle portion. A coil mounted within the handle portion of the housing receives the inner end of a metallic core which has an outer probe end extending outwardly from the handle portion within the probe portion such that an AC voltage applied to the coil generates a pulsating flux in the probe end of the core for performing the demagnetizing of a tape sensing head. A bulb also mounted within the handle portion of the housing shines light outwardly through the probe portion thereof in order to illuminate the sensing head and the surrounding area as the demagnetizing is performed.

Another object of the invention is to provide an improved magnetic tape sensing head demagnetizer including a clear plastic housing probe portion that receives an outer probe end of a coil core and which transmits illumination from a bulb mounted within a handle portion of the demagnetizer and energized by a portion of the voltage across the coil upon actuation of a switch.

A disclosed embodiment of the demagnetizer accomplishes both of the above objects as well as other objects of the invention in a preferred manner by the construction of the clear plastic probe portion and the positioning of the bulb and the probe end of the core with respect to the probe portion. An inner end of the clear plastic probe portion is mounted by one end of the hollow handle portion of the housing that receives the coil, the switch, and the bulb. The probe end of the core projects outwardly from the handle portion within the clear plastic probe portion adjacent one side edge of the probe portion. The bulb is positioned adjacent the inner end of the probe portion closer to the other side edge thereof so that the illumination from the bulb is transmitted alongside the probe end of the core. Oppositely facing flat surfaces of the probe portion connect the side edges which taper toward each other in a direction toward the outer distal end of the probe portion so that there is an intensification of the illumination due to the tapering.

Handling of the demagnetizer is facilitated by an elongated construction of the hollow handle portion of the housing. Side walls of the handle portion taper toward each other from one larger end of the handle portion to another smaller end thereof where the clear plastic probe portion of the housing projects outwardly. One flat wall of the handle portion connects the side walls and has an actuating button of the switch projecting outwardly through an opening in this wall. Depression of the button by a user's thumb or finger closes the switch to engergize the demagnetizer. Another curved wall of the handle portion faces in an opposite direction to the flat wall and has a curved shape that gives an intermediate section of the handle portion a flattened construction as well as providing the end from which the probe portion projects with a smaller size than the intermediate section.

The objects, features, and advantages of the present invention are readily apparent from the following detailed description of the preferred embodiment taken in connection with the accompanying drawings.

BRIEF DESCRIPTION OF THE DRAWINGS

FIG. 1 is a perspective view of a magnetic tape sensing head demagnetizer according to the present invention shown adjacent a phantom line indicated tape playing component having a slot into which a tape cartridge to be playing is inserted;

FIG. 2 is a side elevation view showing the demagnetizer positioned with a probe thereof inserted into the slot of the tape playing component so that a tape sensing head will be demagnetized upon operation of the demagnetizer;

FIG. 3 is a broken away view of the demagnetizer taken partially in section along line 3—3 of FIG. 2;

FIG. 4 is a view of the demagnetizer taken partially in section along line 4—4 of FIG. 3; and FIG. 5 is a schematic electrical view of a switch, a bulb, and a coil of the demagnetizer.

DETAILED DESCRIPTION OF THE PREFERRED EMBODIMENT

With reference to FIG. 1, a demagnetizer according to the present invention is generally indicated by 10 and includes a handle 12 and a probe 14 that projects from the handle. A tape playing component 16 for playing a magnetic tape cartridge has a slot 18 into which the cartridge is inserted. Insertion of the demagnetizer probe 14 into the slot 18 as shown in FIG. 2 positions the probe adjacent a schematically indicated metallic sensing head 20 such that energization of the demagnetizer removes permanent magnetism from the sensing head by generation of a pulsating flux. Depression of a switch button 22 energizes the demagnetizer with an AC voltage supplied through a cord 24 in a manner that is hereinafter described.

With additional reference to FIGS. 3 and 4, the demagnetizer includes a housing having an opaque handle portion 26 that forms the handle 12 of the demagnetizer and a clear plastic probe portion 28 which is part of the probe 14. A wound wire coil 30 is mounted within the hollow handle portion 26 of the housing as shown in FIG. 3 between integral lugs 32 and is secured in a suitable manner such as by adhesive or heat bonding. One inner end 34 of a ferromagnetic core 36 is received by the core 30 extending therethrough such that AC voltage applied to the coil generates a pulsating flux of alternating north-south polarity. An outer probe end 38 of the core projects outwardly from the housing handle portion within the solid plastic probe portion 28 of the housing and terminates adjacent a distal end 40 thereof so as to provide demagnetizing of a magnetic tape sensing head when positioned as shown in FIG. 2. Illumination of the sensing head is provided by a bulb 42 screwed into a socket 44 which is located between integral lugs 46 of the housing handle portion 26. Depression of the switch button 22 shown in FIG. 4 closes a normally open switch 48 to apply voltage across the coil 30 as well as energizing the bulb 42. This energization of the bulb 42 shines light onto an inner end 50 the clear plastic probe portion 28 which acts like a fiber optic to transmit the light to its outer distal end 40 in order to provide the illumination of the sensing head being demagnetized.

With additional reference to FIG. 5 and continuing reference to FIGS. 3 and 4, cord wires 51 and 52 supply an AC voltage to the demagnetizer from a 110 volt outlet into which the cord 24 is plugged. A plastic cord insert 54 (FIG. 3) receives the cord as it extends into the housing handle portion 26 for winding in an S shape about integral lugs 56 of the handle portion in order to prevent outward pulling of the cord. Wire 51 extends from the lugs 56 to a soldered connection 58 with switch 48, while wire 52 has a soldered connection 60 to the coil 30. Another soldered connection 62 on the other side of switch 48 from connection 58 secures wires 64 and 66 that connect to the bulb 42 and coil 30, respectively, as best seen in FIG. 5. A wire 68 on the opposite side of bulb 42 from wire 64 has a soldered connection 70 with coil 30 at an intermediate portion thereof so that a portion of the 110 AC voltage across the coil is supplied to the bulb. Bulb 42 is of a one volt rating and is energized with this voltage or slightly less so that it has a relatively extended lifetime before burning out and requiring replacement. Also, even if the bulb does burn out, the coil 30 is still energized upon closing of the switch 48 by the circuitry so that the demagnetizing can be performed.

As best seen by combined reference to FIGS. 1–3, the clear plastic housing probe portion 28 has oppositely facing flat surfaces 72 and side edges 74 that connect the flat surfaces while extending between the inner end 50 and the outer distal end 40 of the probe portion. The probe end 38 of the coil core 36 is located closer to one of the side edges 74 than the other while the bulb 42 is located closer to the other side edge as best seen in FIG. 3. This construction gives the probe portion 28 good light gathering and transmission characteristics. Side edges 74 taper toward each other from the inner end 50 of the probe portion 28 toward its outer distal end 40 so that the light gathered at the inner end and transmitted alongside the core probe end 38 is intensified somewhat before reaching the distal end. Also, the probe end 38 of the core can either have the probe portion 28 molded about it during injection molding or it can be inserted within a molded or drilled hole of the probe portion during assembly.

Housing handle portion 26 has an elongated construction that is easily grasped to facilitate use of the demagnetizer. Side walls 76 of the handle portion taper as can be seen in FIG. 3 with a somewhat curved shape toward each other from one larger end of the handle portion where the cord 24 is located to another smaller end where the inner end 50 of the housing probe portion 28 is located. A flat wall 78 from which the switch button 22 projects through a suitable opening 80 (FIG. 4) connects the side walls 76 as does a curved wall 82. Curved wall 82 forms the handle portion 26 with a flattened intermediate section and a smaller size at the end where the probe 14 projects outwardly. This handle shape permits the button to be depressed by either a thumb actuation or by a forefinger actuation. In the former case, the forefingers will be wrapped around the wall 82 adjacent the smaller end of the handle portion and in the latter case the thumb will be positioned at this location.

With reference to FIGS. 3 and 4, while the switch 48 is herein shown as assembled from separate components, it could also be of a preassembled construction with a separate housing that is positioned in a suitable manner within the housing handle portion 26. As shown, a lug 84 that projects from the flat wall 78 supports one switch leaf 86 to which the wire 50 is secured by connection 58. Another switch leaf 88 is located in a spaced relationship to the leaf 86 by a flange 90 of lug 84. Leaf 86 is connected to both the coil 30 and the bulb 42 by the soldered connection 62 to wires 64 and 68. Both leaf 86 and leaf 88 may be secured to the flange 90 of lug 84 by heat or adhesive bonds. A lug 92 on the switch button 22 extends downwardly through the leaf 86 and through an opening 94 in the leaf 88. The leaf 86 positions button 22 upwardly as shown in FIG. 4 so that the switch is normally open. Downward depression of button 22 against the resiliency of leaf 86 moves this leaf to the phantom line position shown where it engages the leaf 88 and closes the switch to energize the demagnetizer.

While a preferred embodiment of the demagnetizer is herein described in detail, various alternative designs and embodiments can be utilized as will be apparent to those skilled in the art to practice the invention defined by the following claims.

What is claimed is:

1. A magnetic tape sensing head demagnetizer comprising: a housing having a hollow handle portion and a clear plastic probe portion projecting outwardly from the handle portion; a coil in the handle portion of the housing; a metallic core having an inner end received by the coil and an outer probe end extending outwardly from the handle portion of the housing within the probe portion thereof such that an AC voltage applied to the coil generates a pulsating flux in the probe end of the core for demagnetizing a tape sensing head; a bulb mounted within the handle portion of the housing to shine light outwardly through the probe portion thereof in order to illuminate the tape sensing head and the surrounding area during the demagnetizing and means to selectively apply an AC voltage to said coil and said bulb.

2. A magnetic tape sensing head demagnetizer comprising: a housing having a hollow handle portion and a clear plastic probe portion projecting outwardly from the handle portion; a coil in the handle portion of the housing; an elongated ferromagnetic core having an inner end received by the coil and an outer probe end extending outwardly from the handle portion of the housing within the probe portion thereof such that an AC voltage supplied to the coil generates a pulsating flux in the probe end of the core for demagnetizing a tape sensing head; a bulb mounted within the handle portion of the housing to shine light outwardly through the probe portion thereof in order to illuminate the tape sensing head and the surrounding area during demagnetizing; and means including a switch to selectively supply an AC voltage to the coil and to concomitantly supply a portion of the voltage across the coil to the bulb.

3. A magnetic tape sensing head demagnetizer comprising: a housing having a hollow handle portion and a solid clear plastic probe portion projecting from the handle portion; the housing probe portion having an inner end mounted by the handle portion and a distal outer end as well as opposite edges extending between the inner and outer ends; a coil in the handle portion of the housing; an elongated ferromagnetic core having an inner end received by the coil; said core also having an outer probe end extending outwardly from the handle portion of the housing within the probe portion thereof closer to one of said opposite edges than to the other edge; a bulb mounted within the handle portion of the housing adjacent the inner end of the probe portion closer to said other edge thereof than to the one edge in order to shine light outwardly through the probe portion alongside the probe end of the core to provide illumination at the outer distal end of the probe portion; and means including a switch to selectively supply an AC voltage to the coil and to concomitantly supply a portion of the voltage across the coil to the bulb such that a pulsating flux is generated at the probe end of the core to demagnetize a tape sensing head while also illuminating the area about the sensing head.

4. A magnetic tape sensing head demagnetizer comprising: an elongated handle having a hollow housing portion including a curved intermediate section that is manually grasped and an end of a smaller size than the intermediate section; a probe projecting from said end of the handle housing and including a clear plastic probe housing portion with an inner end mounted by the handle housing portion and a distal outer end; said probe housing portion having opposite edges extending between the inner and outer ends thereof; a coil in the hollow handle portion; an elongated ferromagnetic core having an inner end received by the coil and an outer probe end extending outwardly from the handle portion of the housing within the probe housing portion closer to one of said opposite edged thereof than to the other edge; a bulb mounted within the handle housing portion adjacent the inner end of the clear plastic probe housing portion closer to said other edge thereof than the one edge in order to shine light outwardly through the probe housing portion alongside the probe end of the core to provide illumination at the outer distal end of the probe housing portion; and means including a normally open switch that is selectively closed to supply an AC voltage to the coil and to concomitantly supply a portion of the voltage across the coil to the bulb such that a pulsating flux is generated at the probe end of the core to demagnetize a tape sensing head while also illuminating the area about the sensing head.

5. A magnetic tape sensing head demagnetizer comprising: a housing having a hollow handle portion and a solid clear plastic probe portion projecting from the handle portion; the housing probe portion having an inner end mounted by the handle portion and a distal outer end; the probe portion having oppositely facing flat surfaces and opposite edges that connect the flat surfaces; said edges tapering toward each other in a direction toward the outer distal end of the probe portion; a coil in the handle portion of the housing; an elongated ferromagnetic core having an inner end received by the coil; said core also having an outer probe end extending outwardly from the handle portion of the housing within the probe portion thereof closer to one of said edges than to the other edge; a bulb mounted within the handle portion of the housing adjacent the inner end of the probe portion closer to said other edge thereof than to the one edge in order to shine light outwardly through the probe portion alongside the probe end of the core to provide illumination at the outer distal end of the probe portion; and means including a normally open switch that is selectively closed to supply an AC voltage to the coil and to concomitantly supply a portion of the voltage across the coil to the bulb such that a pulsating flux is generated at the probe end of the core to demagnetize a tape sensing head while also providing illumination through the tapered probe portion to the area about the sensing head.

6. A magnetic tape sensing head demagnetizer comprising: a housing having an elongated hollow handle portion and a solid clear plastic probe portion projecting from one end of the handle portion; the housing handle portion having side walls that taper toward each other in a direction toward the probe portion; the probe portion having an inner end mounted by the handle portion and a distal outer end; the probe portion having oppositely facing flat surfaces and opposite side edges that connect the flat surfaces; said side edges tapering toward each other in a direction toward the outer distal end of the probe portion; a coil mounted within the handle portion of the housing; an elongated ferromagnetic core having an inner end extending through the coil; said core also having an outer probe end extending outwardly from the handle portion of the housing within the probe portion thereof closer to one of said side edges than to the other side edge; a bulb mounted within the handle portion of the housing adjacent the inner end of the probe portion closer to said other side edge thereof than to the one side edge in order to shine light outwardly through the probe portion alongside the probe end of the core to provide illumination at the outer distal end of the probe portion; and means including a normally open switch that is selectively closed to supply an AC voltage to the coil and to concomitantly supply a portion of the voltage across the coil to the bulb such that a pulsating flux is generated at the probe end of the core to demagnetize a tape sensing head while also providing illumination through the tapered probe portion to the area about the sensing head.

* * * * *